(12) United States Patent
Cheng et al.

(10) Patent No.: US 8,963,836 B2
(45) Date of Patent: Feb. 24, 2015

(54) METHOD AND SYSTEM FOR GESTURE-BASED HUMAN-MACHINE INTERACTION AND COMPUTER-READABLE MEDIUM THEREOF

(75) Inventors: Tong Cheng, Guangdong (CN); Shuai Yue, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 73 days.

(21) Appl. No.: 13/697,518

(22) PCT Filed: Aug. 16, 2011

(86) PCT No.: PCT/CN2011/078483
§ 371 (c)(1),
(2), (4) Date: Nov. 12, 2012

(87) PCT Pub. No.: WO2012/034469
PCT Pub. Date: Mar. 22, 2012

(65) Prior Publication Data
US 2013/0162532 A1 Jun. 27, 2013

(51) Int. Cl.
*G06F 3/0488* (2013.01)
*G06F 3/01* (2006.01)
(52) U.S. Cl.
CPC ............ *G06F 3/04883* (2013.01); *G06F 3/017* (2013.01)
USPC ......................................................... 345/157
(58) Field of Classification Search
USPC ........................................................ 345/156
See application file for complete search history.

(56) References Cited

U.S. PATENT DOCUMENTS 4,843,568 A * 6/1989 Krueger et al. ............... 382/100
5,025,314 A * 6/1991 Tang et al. ................. 348/14.08
(Continued)

FOREIGN PATENT DOCUMENTS

CN 101344816 A 1/2009
CN 101609362 A 12/2009
(Continued)

OTHER PUBLICATIONS

Japanese Patent Office, "Notice of Reason to Rejection", Jan. 21, 2014, Japan.
(Continued)

*Primary Examiner* — Van Chow
(74) *Attorney, Agent, or Firm* — Tim Tingkang Xia, Esq.; Morris, Manning & Martin, LLP

(57) ABSTRACT

A method and system for gesture-based human-machine interaction and computer-readable medium are provided. The system includes a capturing module, a positioning module, and a transforming module. The method includes the steps of: capturing images from a user's video streams, positioning coordinates of three or more predetermined color blocks in the foreground, simulating movements of a mouse according to the coordinates of the first color block, and simulating click actions of the mouse according to the coordinates of the other color blocks. The embodiments according to the current disclosure position coordinates of a plurality of color blocks through processing the captured user's video streams, and simulate mouse actions according to the coordinates of the color blocks. Processing apparatuses like computers may be extended to facilitate gesture-based human-machine interactions through a very simple way, and a touch-sensitive interaction effect can be simulated, without the presence of a touch screen.

18 Claims, 4 Drawing Sheets

(56) References Cited

U.S. PATENT DOCUMENTS

| | | | |
|---|---|---|---|
| 5,581,276 A * | 12/1996 | Cipolla et al. | 345/156 |
| 5,594,469 A * | 1/1997 | Freeman et al. | 345/158 |
| 5,616,078 A * | 4/1997 | Oh | 463/8 |
| 5,617,312 A * | 4/1997 | Iura et al. | 700/83 |
| 5,880,725 A * | 3/1999 | Southgate | 715/790 |
| 6,072,494 A * | 6/2000 | Nguyen | 715/863 |
| 6,154,723 A * | 11/2000 | Cox et al. | 704/270 |
| 2003/0076293 A1 | 4/2003 | Mattsson | |

FOREIGN PATENT DOCUMENTS

| | | |
|---|---|---|
| JP | 2003527708 A | 9/2003 |
| JP | 2010500645 A | 1/2010 |

OTHER PUBLICATIONS

State Intellectual Property Office of P. R. China (ISR/CN), "International Search Report", Nov. 3, 2011, China.

State Intellectual Property Office of P. R. China (ISR/CN), "Written Opinion of the International Searching Authority", Nov. 3, 2011, China.

State Intellectual Property Office of P. R. China (ISR/CN), "International Preliminary Report on Patentability", Mar. 19, 2013, China.

Canadian Intellectual Property Office, "Office Action", Jul. 31, 2014, Canada.

* cited by examiner

METHOD AND SYSTEM FOR GESTURE-BASED HUMAN-MACHINE INTERACTION AND COMPUTER-READABLE MEDIUM THEREOF

FIELD OF THE INVENTION

The present disclosure relates generally to the field of computer technology, and more particularly, to a method and system for gesture-based human-machine interaction, and computer-readable medium thereof.

BACKGROUND OF THE INVENTION

Human-machine interaction for the processing devices like computers generally uses mice, keyboards, and monitors. Being accompany with the technology development, it is desired that more convenient and quick method could be used for human-machine interaction. Voice and handwriting pen have been developed to meet the desire accordingly.

During the process of accomplishing the present disclosure, it is discovered by the current inventors that the conventional technology has the drawbacks like:

Voice input may lower the input difficulty when inputting characters, while being rather limited in graphic interface applications. Similarly, pen-based handwriting instructions may have some advantage in inputting Chinese characters, but it is even less convenient than mouse when using in the graphic interface applications.

Therefore, heretofore unaddressed needs exist in the art to address the aforementioned deficiencies and inadequacies.

SUMMARY OF THE INVENTION

In order to solve the problems of human-machine interaction like voice input and pen-based handwriting that is not suitable for the graphic interface applications for the processing devices like computers, embodiments of the present disclosure provide a method and system for gesture-based human-machine interaction, and a non-transitory computer-readable medium thereof.

In one aspect of the disclosure, a method for gesture-based human-machine interaction comprises, capturing images from user's video streams, positioning coordinates of three or more predetermined color blocks in the foreground, simulating movements of a mouse according to the coordinates of the first color block, and simulating click actions of the mouse according to the coordinates of the other color blocks.

In another aspect of the disclosure, a system for gesture-based human-machine interaction comprises, a capturing module configured to capture images from user's video streams, a positioning module configured to position coordinates of three or more predetermined color blocks in the foreground, a transforming module configured to simulate movements of a mouse according to the coordinates of the first color block, and simulating click actions of the mouse according to the coordinates of the other color blocks.

The functionalities are implemented by a non-transitory computer-readable medium.

In yet another aspect of the disclosure, at least one non-transitory computer-readable medium having computer-executive instructions stored thereon that, when executed by a processor, causes a computer to implement a gesture-based human-machine interaction method. The method comprises, capturing images from user's video streams, positioning coordinates of three or more predetermined color blocks in the foreground, simulating movements of a mouse according to the coordinates of the first color block, and simulating click actions of the mouse according to the coordinates of the other color blocks.

Benefits of the technical solution provided by the embodiments of the present disclosure: the embodiments according to the present disclosure can provide coordinates of a plurality of color blocks through processing captured user's video streams, and simulate mouse actions according to the coordinates of the color blocks. Processing apparatuses like computers may be extended to facilitate gesture-based human-machine interactions through a very simple way, and a touch-sensitive interaction effect can be simulated without the presence of a touch screen.

BRIEF DESCRIPTION OF THE DRAWINGS

In order to clearly describe the solution of the embodiments of the present disclosure, the following brief description is given for accompanying drawings of the embodiments. The drawings below shall be regarded only as some of the embodiments of the present disclosure. It shall be apparent for those skilled in the art may create other drawings according to these drawings below without departing from the true spirit and scope of this invention.

DESCRIPTION OF THE PREFERRED EMBODIMENTS

Figure 1:
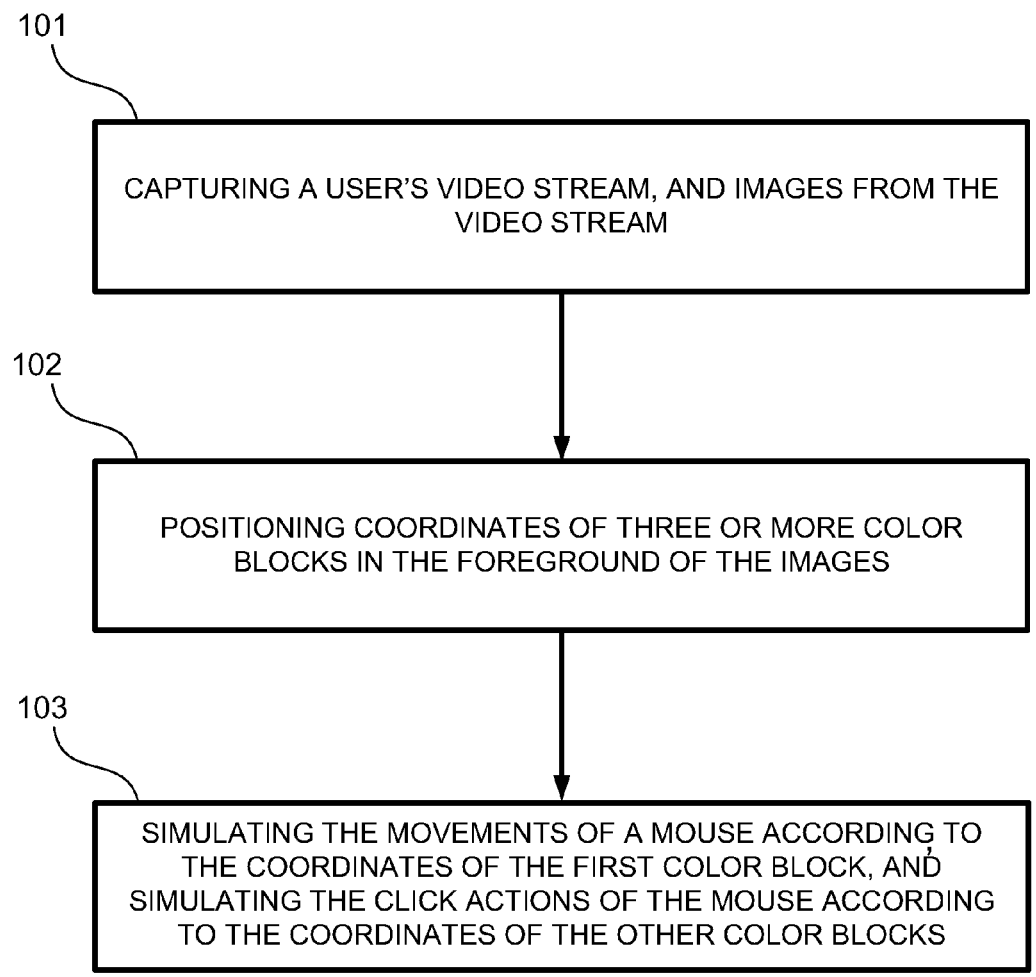
FIG. 1 is a conceptual flow chart of one embodiment in accordance with the present disclosure.

The present disclosure is more particularly described in the following examples that are intended as illustrative only since numerous modifications and variations therein will be apparent to those skilled in the art. Various embodiments of the invention are now described in detail. Referring to the drawings, like numbers indicate like components throughout the views.

A principle of the present disclosure is to simulate the mouse operation through the movement of the users' fingers, wherein the movements of the users' fingers are determined by processing the user's video streams. Color block templates may be pre-captured respectively in relation to three fingers, and the captured video streams are processed to determine the position of the fingers. One of the fingers may be used for simulating the movement of the mouse, and the other two fingers may be used for simulating the click action of the mouse. The OpenCV of Intel Corporation has provided the source code library including open sources codes for image processing; the current embodiment may be coded through OpenCV programming. Detailed descriptions of the embodiments of the present disclosure are described below.

The First Embodiment

The first embodiment of the present disclosure provides a method for gesture-based human-machine interaction. FIG. 1 conceptually illustrates the associated steps of the method. The method includes:

Step 101, capturing user's video stream and images from the user's video stream;

Step 102, positioning coordinates of three or more predetermined color blocks in the foreground of the images;

Step 103, simulating the movements of a mouse according to the coordinates of the first color block, and simulating the click actions of the mouse according to the coordinates of the other color blocks.

The embodiment of the present disclosure positions coordinates of a plurality of predefined color blocks through processing the captured user's video streams, and simulates mouse actions according to the coordinates of the color blocks. Processing apparatuses like computers may be extended to facilitate gesture-based human-machine interactions through a very simple way, and a touch-sensitive interaction effect can be simulated without the presence of a touch screen.

The Second Embodiment

Figure 2:
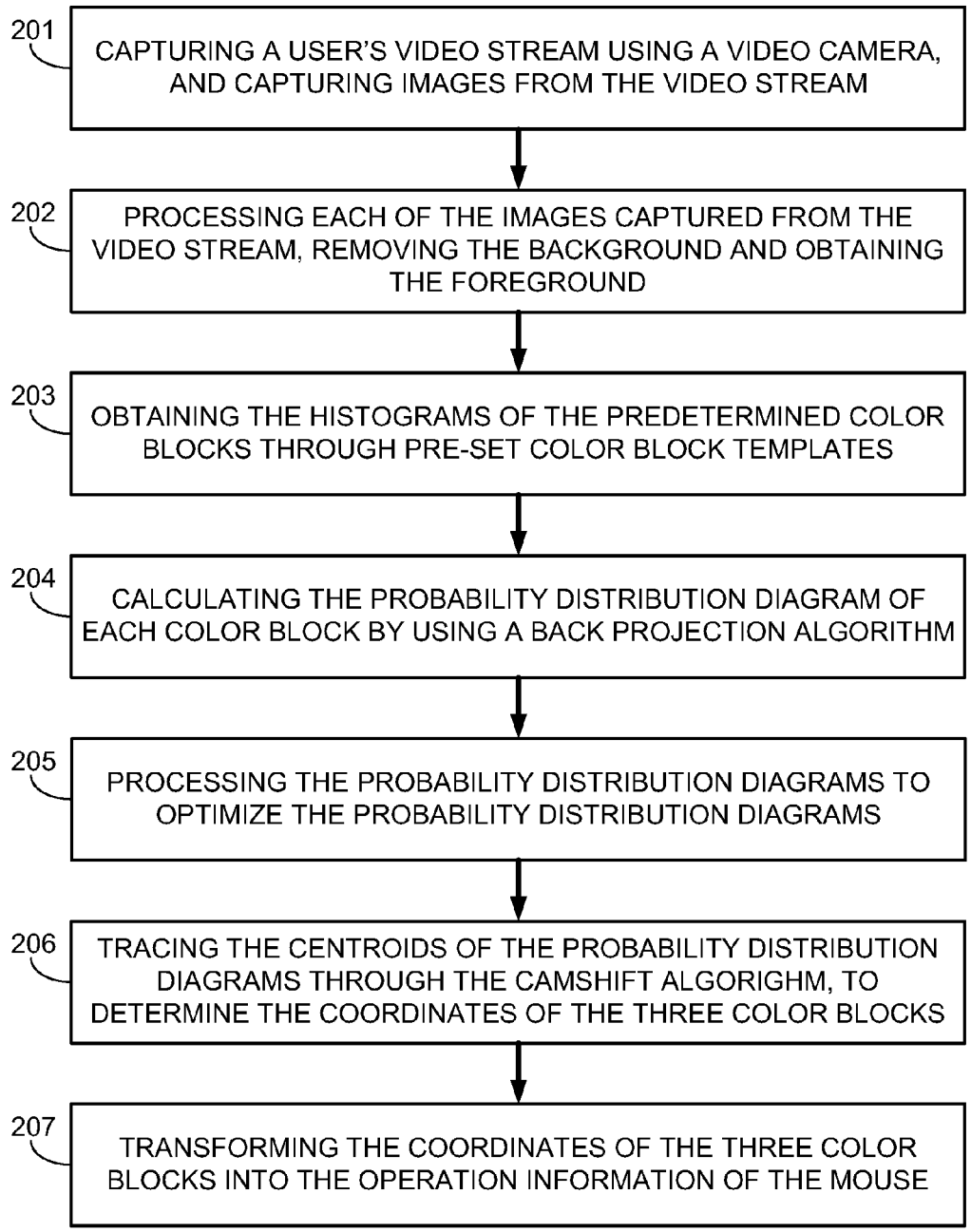
FIG. 2 is a conceptual flow chart of another embodiment in accordance with the present disclosure.

The second embodiment of the present disclosure is based on improving the first embodiment. FIG. 2 conceptually illustrates the flow thereof. The method includes:

Step 201, capturing user's video stream using a video camera, and capturing images from the user's video stream;

The captured images may be either continuous or discrete. Usually, the velocity of the movement of the users' finger may not be rather high, which makes it possible not to necessarily process all the images, further benefits in saving the processing cost. It should be apparent that for more accuracy requirement, each image captured from the video stream could be processed, and the present disclosure is not limited thereto.

Step 202, processing each of the images captured from the video stream, removing the background, and obtaining the foreground. It could be understood that usually the environment, like office or home, has little changes in the background of the video stream; the background shall be easy to be determined. Therefore, detailed step 202 includes:

Step 2021, setting up a background model through Code Book algorithm for generating a mask picture; the mask picture may have the same size as the processing image; the foreground of the mask picture is white; and the background of the mask picture is black;

Step 2022, matching the mask picture with the processing image for removing the corresponding image parts; there may be one mask picture; the background model may be used in every remove action practiced on the captured images, for obtaining the foreground image parts.

It should be understood that obtaining the foreground of the images through Code Book algorithm is only one of the selections for the current embodiment. The present disclosure shall not be limited to this selection and description.

Step 203, obtaining the histograms of the predetermined color blocks through pre-set color block templates.

According to one exemplary embodiment, the movement of one finger on one hand is used for simulating the movement of a mouse, and the two fingers on the other hand are used for simulating the click action of the mouse. Accordingly, it is necessary to track at least three predetermined color blocks.

Moreover, for more distinguishability of the three color blocks, the user may wear three sleeves on different fingers with different colors that are easy to be distinguished. The designated colors shall be stored as templates for the three color blocks, which simplifies the processing.

In accordance with one exemplary embodiment, the OpenCV of Intel Corporation could be used for coding the image processing. OpenCV is supported by Intel Corporation, it is an open source code library for computer vision, and is free for either commercial or non-commercial use. The histograms of the foreground could be calculated through the histogram function in the OpenCV. In the OpenCV, a series of the histogram functions has been packed into the DenseHistogram class, therefore made it possible to calculate the histograms of the images through the "Calculate" thereof.

Color histogram is a kind of color characters, and is widely used in multiple image search engine systems. Color histogram is used for describing the proportion of the different colors to the whole image. Color histogram is much suitable to describe those images that are hard to be distinguished automatically.

The operation described below is executed on the three color blocks, to determine the position of the fingers that are corresponding to the three color blocks, and to determine the click action of the mouse. That is, the step 203 is detailed in:

Step 204, getting the images that are captured in the step 201 and the histograms of the three color blocks that are obtained in the step 203, and calculating the probability distribution diagram of each color block through the Back Projection algorithm.

The details on how the probability distribution diagrams is calculated through the histograms will not be described here since the calculation is known for those skilled in the art.

Step 205, processing the probability distribution diagrams to optimize the probability distribution diagrams.

There may include noise and sawtooth in the probability distribution diagrams obtained from the step 204, therefore it would be necessary to do the image de-noising and smoothing process in the step 205, to make the color blocks more accurate. That is, step 205 includes:

Step 2051, using a noise erosion operation to remove noise from the probability distribution diagrams;

Step 2052, The probability distribution diagrams is further processed by a Gaussian smoothing process; and threshold segmentation is executed on the Gaussian smoothed probability distribution diagrams. The threshold segmentation refers to the operation as: setting a predetermined threshold, determining the pixel as the foreground when the pixel of the image is less than the threshold; and determining the pixel as the background when the pixel of the image is not less than the threshold.

Step 206, tracing the centroids of the probability distribution diagrams through the CAMShift (Continuously Apative Mean-Shift) algorithm, to determine the coordinates of the centers of the three color blocks.

The CAMShift algorithm is a common movement tracing algorithm, which traces through the color information of the moving objects in a video stream. After transforming the original images into the color probability distribution diagrams through the Back Projection algorithm, it is possible to calculate the coordinates of the centers of the three color blocks, deemed as the coordinates of the three color blocks.

Step 207, transforming the coordinates of the three color blocks into the operation information of the mouse.

After the coordinates of the centers of the three color blocks are determined, the coordinates of the first color block are transformed as the coordinates of the mouse, and the click action of the left key of the mouse may be determined by the coordinates of the second and the third color blocks. For example, the distance between the second and the third color blocks are used for determining the click action of the left key of the mouse. When the distance between the second and the third color blocks are less than a predetermined value, it could be regarded that the left key of the mouse is pressed. When the distance is not less than the predetermined value, it could be regarded that the left key of the mouse is released.

In accordance with the current embodiment, through the OpenCV open source code library, the first block of the gesture is transformed into the coordinates of the mouse, and the second and the third blocks of the gesture are transformed into the click actions of the mouse. Human-machine interaction could hereby be accomplished through an easy way.

It shall be noted that the three color blocks mentioned in the current embodiment shall not be regarded as the limit to the present disclosure.

Furthermore, the method is implemented by one or more non-transitory computer-readable medium having computer-executive instructions stored thereon that, when executed by a processor, causes a computer to implement a gesture-based human-machine interaction method.

The Third Embodiment

Figure 3:
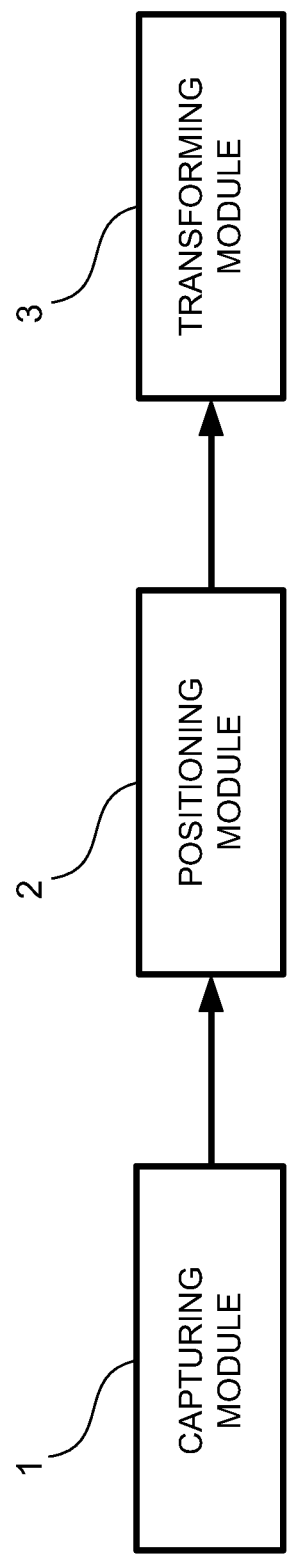
FIG. 3 is a conceptual block diagram of yet another embodiment in accordance with the present disclosure.

The third embodiment of the present disclosure provides a system for gesture-based human-machine interaction. FIG. 3 illustrates the structure of the system for gesture-based human-machine interaction. The system includes:

A capturing module 1, configured to capture a user's video stream and the images from the video stream;

A positioning module 2, configured to position the coordinates of three or more predetermined color blocks in the foreground of the images;

A transforming module 3, configured to simulate the movement of the mouse according to the coordinates of the first color block, and simulating the click actions of the mouse according to the coordinates of the other color blocks.

The embodiment of the present disclosure positions coordinates of a plurality of predefined color blocks through processing the captured user's video streams, and simulates mouse actions according to the coordinates of the color blocks. Processing apparatuses like computers may be extended to facilitate gesture-based human-machine interactions through a very simple way, and a touch-sensitive interaction effect can be simulated without the presence of a touch screen.

The Fourth Embodiment

Figure 4:
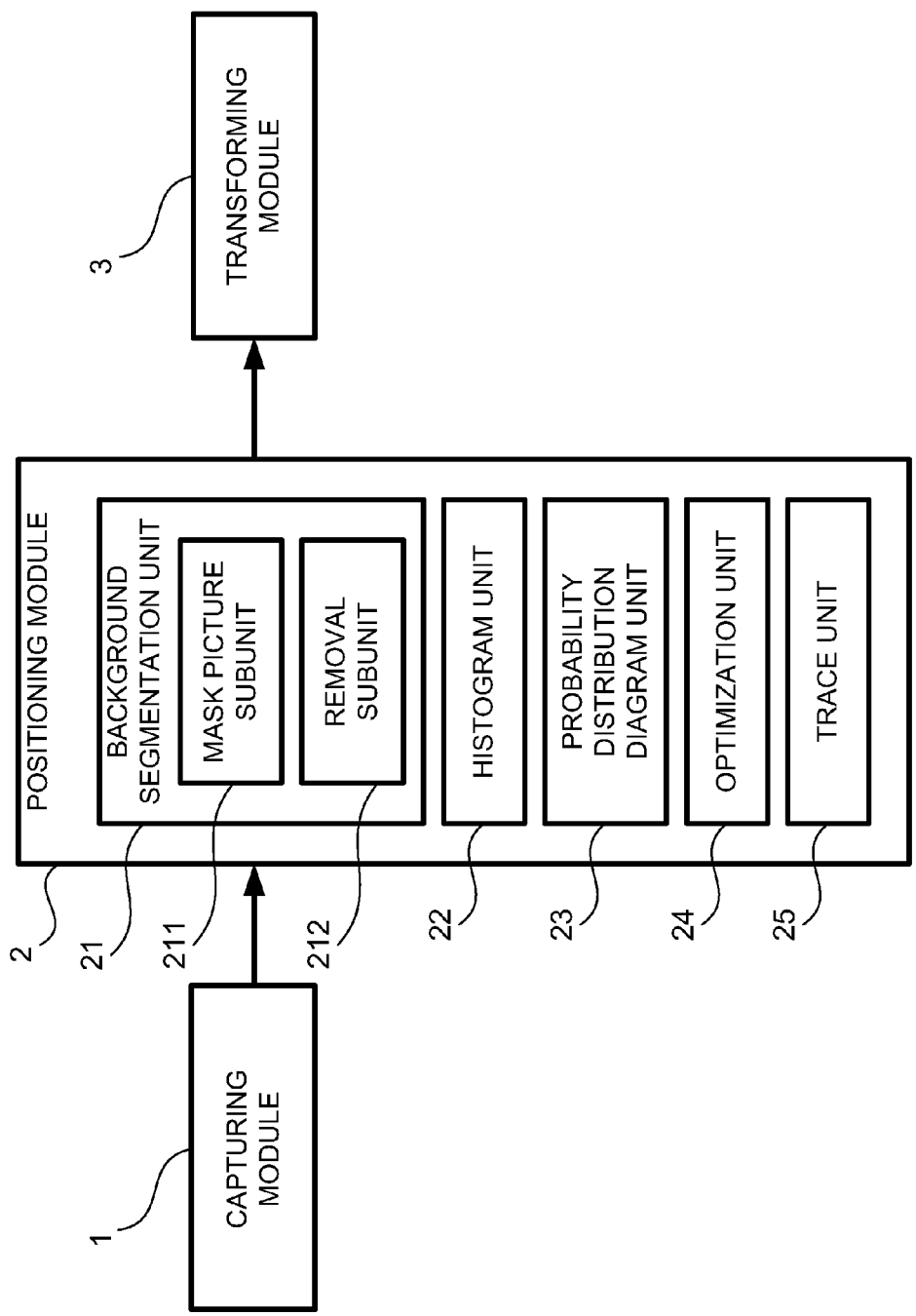
FIG. 4 is a conceptual block diagram of a further embodiment in accordance with the present disclosure.

The fourth embodiment of the present disclosure is based on the improvement of the third embodiment. FIG. 4 conceptually illustrates the structure of the fourth embodiment. The system includes:

A capturing module 1, configured to capture a user's video stream through a video camera, and capturing images from the user's video stream;

The captured images may be either continuous or discrete. Usually, the velocity of the movement of the users' finger may not be very high, making it possible not to necessarily process all the images, further benefits in saving the processing cost. It should be apparent that for a higher accuracy requirement, each image captured from the video stream should be processed, and the present disclosure is not limited thereto.

A positioning module 2, configured to remove the background of the images, and positioning the coordinates of three color blocks in the foreground. The detailed positioning module 2 may include:

A background segmentation unit 21, configured to process each captured image, to remove the background of the image and obtain the foreground of the image. It could be understood that usually the environment, like an office or a home, has little changes in the background of the video stream, and the background shall be easy to be determined. Therefore, detailed background segmentation unit 21 includes:

A mask picture subunit 211, configured to set up a background model through Code Book algorithm and generating a mask picture; the mask picture may have the same size as the image being processed. In one embodiment, the foreground of the mask picture is white, and the background of the mask picture is black.

A removal subunit 212, configured to match the mask picture with the image being processed, and removing corresponding image parts. There may be one mask picture. The background model may be used in every removing action practiced on the images being processed for obtaining the foreground image parts.

It should be understood that obtaining the foreground of the images through Code Book algorithm is only one of selections used in the current embodiment. The present disclosure shall not be limited only to this selection and description.

A histogram unit 22, configured to obtain the histograms of the predetermined color blocks by using pre-set color block templates.

According to one exemplary embodiment, the movement of one finger on one hand is used for simulating the movement of the mouse. The two fingers on the other hand is used for simulating the click action of the mouse. Accordingly, it is necessary to track at least three predetermined color blocks.

Moreover, for more distinguishability of the three color blocks, the user may wear three sleeves on different fingers with different colors that are easy to be distinguished. The designated colors shall be stored as templates for the three color blocks, which simplifies the processing.

In accordance with one exemplary embodiment, the OpenCV of Intel Corporation could be used for coding the image processing. OpenCV is supported by Intel Corporation, it is an open source code library for computer vision, and is free for either commercial or non-commercial use. The histograms of the foreground could be calculated through the histogram function in the OpenCV. In the OpenCV, a series of the histogram functions has been packed into the DenseHistogram class, therefore made it possible to calculate the histograms of the images through the "Calculate" thereof.

Color histogram is a kind of color characters, and is widely used in multiple image search engine systems. Color histogram is used for describing the proportion of the different colors to the whole image. Color histogram is much suitable to describe those images that are hard to be distinguished automatically.

The step described here is executed on the three color blocks, to determine the position of the fingers that are corresponding to the three color blocks, and to determine the click action of the mouse.

A probability distribution diagram unit 23, configured to calculate the probability distribution diagram of each color block by using the Back Projection algorithm according to the images that are captured by the capturing module 1. The histograms of the three color blocks that are obtained by the histogram unit 22.

The details on how the probability distribution diagrams is calculated using the histograms will not be described here since the calculation is known for those skilled in the art.

An optimization unit 24, configured to process the probability distribution diagrams to optimize the probability distribution diagrams.

The probability distribution diagrams calculated by the probability distribution diagram unit 23 may include noise and sawtooth. Therefore it would be necessary for the optimization unit 24 to remove noise and apply smoothing process to make the color blocks more accurate. The optimization unit 24 includes:

A noise removing subunit, adapted to remove noise in the probability distribution diagrams by using a noise erosion operation;

A smoothing subunit, adapted to operate a Gaussian smoothing process on the probability distribution diagrams, and executing threshold segmentation on the Gaussian smoothed probability distribution diagrams. The threshold segmentation refers to the operation as: setting a predetermined threshold, determining the pixel as the foreground when the pixel of the image is less than the threshold; and determining the pixel as the background when the pixel of the image is not less than the threshold.

A trace unit 25, adapted to trace the centroids of the probability distribution diagrams through the CAMShift (Continuously Apative Mean-Shift) algorithm, to determine the coordinates of the centers of the three color blocks, deemed as the coordinates of the three color blocks.

The CAMShift algorithm is a kind of practiced movement tracing algorithm, which traces through the color information of the moving objects in the video stream. After transforming the original images into the color probability distribution diagrams through the Back Projection algorithm, it could be possible to calculate the coordinates of the centers of the three color blocks.

A transforming module 3, adapted to transform the coordinates of the three color blocks into the operation information of the mouse.

After the coordinates of the centers of the three color blocks are determined, the coordinates of the first color block are transformed as the coordinates of the mouse, and the click action of the left key of the mouse could be determined by the coordinates of the second and the third color blocks. As an example, the distance between the second and the third color blocks are used for determining the click action of the left key of the mouse. When the distance between the second and the third color blocks are less than a predetermined value, it could be regarded that the left key of the mouse is pressed; when the distance is not less than the predetermined value, it could be regarded that the left key of the mouse is released.

In accordance with the current embodiment, through the OpenCV open source code library, the first color block of the gesture is transformed into the coordinates of the mouse, and the second and the third color blocks of the gesture are transformed into the click actions of the mouse. Human-machine interaction could hereby be accomplished through an easy way.

It shall be noted that the three color blocks mentioned in the current embodiment shall not be regarded as the limitation to the present disclosure.

The spirit and principle of the systems according to the third and the fourth embodiments are identical with the aforementioned methods according to the first and the second embodiments, therefore, the identical parts would not be described.

The unit as provided by the embodiment of the present disclosure could be recorded on a non-transitory computer-readable medium if the units are provided as the software functional units, and distributed and used as individual products. Based on such understanding, the current inventive disclosure can be made as the individual products. The individual product could be recorded in a storage medium, and includes instructions for making a processing device (such as a personal computer, a server, or a network device) to execute the whole or part of the method as described by the embodiments according to the present disclosure. Such storage medium can be a USB flash memory, a portable hard disk, a read-only memory, a random access memory, a magnetic disk, an optical disk, or any other medium that is able to store program codes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for gesture-based human-machine interaction, comprising:

capturing images from a video stream of a user, wherein each of the images comprises a foreground and a background, and the foreground comprises three or more predetermined color blocks, wherein the three or more predetermined color blocks comprises at least one color block corresponding to one hand of the user, and at least two color blocks corresponding to the other hand of the user;

positioning coordinates of the three or more predetermined color blocks in the foreground of the images; and simulating movements of a mouse according to the coordinates of the at least one color block corresponding to the one hand of the user, and simulating click actions of the mouse according to the coordinates of the at least two color blocks corresponding to the other hand of the user.

2. The method for gesture-based human-machine interaction according to claim 1, wherein the step of capturing images comprises:

capturing the video stream using a video camera, and capturing continuous images from the video stream, or capturing discrete images from the video stream in a predetermined interval.

3. The method for gesture-based human-machine interaction according to claim 2, wherein the step of positioning coordinates comprises:

setting up a background model for generating a mask picture, and removing the background of the images by the mask picture;

obtaining predetermined templates of a first color block, a second color block and a third color block of the three or more predetermined color blocks, wherein the first color block corresponds to one finger of the one hand of the user, and the second and third color blocks respectively correspond to two fingers of the other hand of the user;

generating a histogram corresponding to each of the first, second and third color blocks according to the images;

calculating a probability distribution diagram of each of the first, second and third color blocks according to the corresponding histogram; and tracing a centroid of each of the first, second and third color blocks in the probability distribution diagram, to determine the coordinates of the first, second and third color blocks.

4. The method for gesture-based human-machine interaction according to claim 3, wherein the step of simulating click actions of the mouse according to the coordinates of the at least two color blocks corresponding to the other hand of the user comprises:
determining a straight line distance between the coordinates of the second color block and the third color block,
determining if the straight line distance is less than a predetermined threshold value;
simulating a press action of a left key of the mouse if the straight line distance is less than the predetermined threshold value; and
simulating a release action of the left key of the mouse if the straight line distance is not less than the predetermined threshold value.

5. The method for gesture-based human-machine interaction according to claim 4, wherein the step of obtaining predetermined templates comprises:
providing three sleeves with three different colors on three different fingers of the user, and
storing the colors of the three sleeves correspondingly as the predetermined templates for the first, second and third color blocks.

6. The method for gesture-based human-machine interaction according to claim 3, further comprising the following steps after the step of calculating the probability distribution diagram:
removing noise of the probability distribution diagrams by using a noise erosion operation; and
applying Gaussian smoothing process on the probability distribution diagrams, and executing threshold segmentation on the Gaussian smoothed probability distribution diagrams.

7. A system for gesture-based human-machine interaction, comprising:
a capturing module configured to capture images from a video stream of a user, wherein each of the images comprises a foreground and a background, and the foreground comprises three or more predetermined color blocks, wherein the three or more predetermined color blocks comprises at least one color block corresponding to one hand of the user, and at least two color blocks corresponding to the other hand of the user;
a positioning module configured to position coordinates of the three or more predetermined color blocks in the foreground of the images; and
a transforming module configured to simulate movements of a mouse according to the coordinates of the at least one color block corresponding to the one hand of the user, and to simulate click actions of the mouse according to the coordinates of the at least two color blocks corresponding to the other hand of the user.

8. The system for gesture-based human-machine interaction according to claim 7, wherein the capturing module captures the video stream through a video camera, and captures continuous images from the video stream, or captures discrete images from the video stream in a predetermined interval.

9. The system for gesture-based human-machine interaction according to claim 8, wherein the positioning module comprises:

a background segmentation unit configured to set up a background model for generating a mask picture, and to remove the background of the images by the mask picture;
a histogram unit configured to obtain predetermined templates of a first color block, a second color block and a third color block of the three or more predetermined color blocks, and to generate a histogram corresponding to each of the first, second and third color blocks according to the images, wherein the first color block corresponds to one finger of the one hand of the user, and the second and third color blocks respectively correspond to two fingers of the other hand of the user;
a probability distribution diagram unit configured to calculate a probability distribution diagram of each of the first, second and third color blocks according to the corresponding histogram; and
a trace unit configured to trace a centroid of each of the first, second and third color blocks in the probability distribution diagram, to determine the coordinates of the first, second and third color blocks.

10. The system for gesture-based human-machine interaction according to claim 9, wherein the transforming module is configured to determine the straight line distance between the coordinates of the second color block and the third color block, and to determine if the straight line distance is less than a predetermined threshold value; to simulate a press action of a left key of the mouse if the straight line distance is less than the predetermined threshold value; and to simulate a release action of the left key of the mouse if the straight line distance is not less than the predetermined threshold value.

11. The system according to claim 10, wherein the system further comprises,
three sleeves with three different colors wore on three different fingers of the user, wherein the colors of the three sleeves are stored correspondingly as the predetermined templates for the first, second and third color blocks.

12. The system according to claim 9, wherein the positioning module further comprises an optimization unit, wherein the optimization unit comprises a noise removing subunit and a smoothing subunit, wherein the noise removing subunit is used to remove noise by applying noise erosion operation on the probability distribution diagrams, and the smoothing subunit is used to apply a Gaussian smoothing process on the probability distribution diagrams, and executing threshold segmentation on the Gaussian smoothed diagrams.

13. At least one non-transitory computer-readable medium having computer-executive instructions stored thereon that, when executed by a processor, cause a computer to implement a gesture-based human-machine interaction method, the method comprising:
capturing images from a video stream of a user, wherein each of the images comprises a foreground and a background, and the foreground comprises three or more predetermined color blocks, wherein the three or more predetermined color blocks comprises at least one color block corresponding to one hand of the user, and at least two color blocks corresponding to the other hand of the user;
positioning coordinates of the three or more predetermined color blocks in the foreground of the images; and
simulating movements of a mouse according to the coordinates of the at least one color block corresponding to the one hand of the user, and simulating click actions of the mouse according to the coordinates of the at least two color blocks corresponding to the other hand of the user.

14. The non-transitory computer-readable medium according to claim 13, wherein the step of capturing images comprises:
   capturing the video stream using a video camera, and capturing continuous images from the video stream, or capturing discrete images from the video stream in a predetermined interval.

15. The non-transitory computer-readable medium according to claim 14, wherein the step of positioning coordinates comprises:
   setting up a background model for generating a mask picture, and removing the background of the images by the mask picture;
   obtaining predetermined templates of a first color block, a second color block and a third color block of the three or more predetermined color blocks, wherein the first color block corresponds to one finger of the one hand of the user, and the second and third color blocks respectively correspond to two fingers of the other hand of the user;
   generating a histogram corresponding to each of the first, second and third color blocks according to the images;
   calculating a probability distribution diagram of each of the first, second and third color blocks according to the corresponding histogram;
   tracing a centroid of each of the first, second and third color blocks in the probability distribution diagram to determine the coordinates of the first, second and third color blocks.

16. The non-transitory computer-readable medium according to claim 15, wherein the step of simulating click actions of the mouse according to the coordinates of the at least two color blocks corresponding to the other hand of the user comprises:
   determining the straight line distance between the coordinates of the second color block and the third color block,
   determining if the straight line distance is less than a predetermined threshold value;
   simulating a press action of a left key of the mouse if the straight line distance is less than the predetermined threshold value; and
   simulating a release action of the left key of the mouse if the straight line distance is not less than the predetermined threshold value.

17. The non-transitory computer-readable medium according to claim 16, wherein the step of obtaining predetermined templates comprises:
   providing three sleeves three different colors on three different fingers of the user, and
   storing the colors of the three sleeves correspondingly as the predetermined templates for the first, second and third color blocks.

18. The non-transitory computer-readable medium according to claim 15, wherein the method further comprises the following steps after the step of calculating the probability distribution diagram:
   removing noise from the probability distribution diagrams by applying a noise erosion operation;
   applying a Gaussian smoothing on the probability distribution diagrams, and executing threshold segmentation on the Gaussian smoothed probability distribution diagrams.

* * * * *